United States Patent [19]

Edgerton

[11] 3,723,526

[45] Mar. 27, 1973

[54] POLY (N-CYCLO ALKYLAMINOMETHYL) CYCLOPENTANES

[75] Inventor: William H. Edgerton, Strafford-Wayne, Pa.

[73] Assignee: Smith Kline & French Laboratories, Philadelphia, Pa.

[22] Filed: May 20, 1971

[21] Appl. No.: 145,565

[52] U.S. Cl. ............................................. 260/563 R
[51] Int. Cl. ............................................. C07c 87/32
[58] Field of Search ........................................ 260/563

[56] References Cited

UNITED STATES PATENTS 3,641,149   2/1972   Edgerton ........................... 260/563 R

*Primary Examiner*—Lewis Gotts
*Assistant Examiner*—D. R. Phillips
*Attorney*—Richard D. Foggio, Joan S. Keps, Alan D. Lourie and Joseph A. Marlino

[57] ABSTRACT

Poly(N-cycloalkylaminomethyl)cyclopentanes and mixed poly(N-cycloaminomethyl)poly(hydroxymethyl)cyclopentanes are prepared by reducing the corresponding polyamido and polyamidopolyester derivatives of cis-cyclopentanetetracarboxylic acid. The compounds are useful as organic intermediates and in the polymer art.

3 Claims, No Drawings

POLY (N-CYCLO ALKYLAMINOMETHYL) CYCLOPENTANES

This is a continuation-in-part application of my copending application Ser. No. 816,393 filed Apr. 15, 1969, now U.S. Pat. No. 3,641,149 issued Feb. 8, 1972.

This invention relates to new poly(N-cycloalkylaminomethyl)cyclopentane derivatives. These new compounds, in the all cis isomeric form, are illustrated by the general formula:

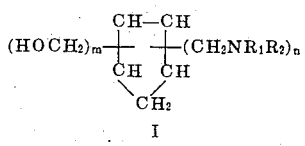

I in which $R_1$ and $R_2$ represent hydrogen or cycloalkyl of from 5–6 carbon atoms at least one of $R_1$ and $R_2$ being cycloalkyl; $n$ is from 1–4; and $m$ is from 0–3, the sum of $m$ and $n$ being 4.

A particularly useful compound is all cis-tetracyclohexylaminomethylcyclopentane and its acid addition salts.

It can be appreciated that these new compounds are polyfunctional aminomethyl or mixed aminomethyl hydroxymethylcyclopentane derivatives. As such they have utility as general chemical intermediates but more specifically they may be used in the secondary state as polybasic amine units for preparing polyurethanes by the methods described in "Condensation Polymers" by P. W. Morgan, Interscience, pages 216–304. The whole class of new compounds may also be used as curing agents for epoxy resins, antioxidants, plasticizing agents and lubricating agents.

The compounds of this invention may also exist and be useful in the form of an acid addition salt with an organic or inorganic acid such as maleic, acetic, propionic, benzoic, succinic acid; hydrochloric, sulfuric, formic, phosphoric, nitric, sulfamic acid. The salts are formed by traditional chemical methods but most usefully be dissolving the amine in a suitable solvent such as ether, then contacting the base with an excess of the acid such as hydrogen chloride, sulfuric acid, etc. The salt separates from solution. The most useful salt form is that with all the amine functions neutralized and in salt form.

The bases of Formula I are most readily prepared by reducing with an excess of lithium aluminum hydride or with a similar reducing agent a compound of the formula:

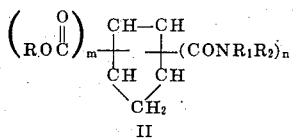

II in which $R_1$, $R_2$, $n$ and $m$ are as described above; R is most conveniently methyl or ethyl because of chemical characteristics of the ester form but can also be hydrogen or an alkali metal salt or ammonium salt.

The chemical reaction is usually carried out by dissolving one mole equivalent of the polyamide (II) in a suitable solvent such as ether, tetrahydrofuran or dioxane. An excess of the reducing agent lithium aluminum hydride in ether is added slowly followed by a period of reaction at from room temperature to the boiling point of the reaction mixture. The minimum quantity in moles of lithium aluminum hydride reducing agent to be used may be calculated from the number of ester or amide groups present in the starting material as follows: $-CONH_2$ (1); $-CONHR_1$ (0.75); $-CONR_1R_2$ (0.5); $-CO_2R$ (0.5); $-CO_2H$ (1).

The reaction mixture is quenched and worked up by standard reaction methods, see Organic Reactions VI, pages 469–509. Other means of reduction are detailed in "Reactions of Organic Compounds" by W. J. Hickenbottom, London (1959) pages 347–348.

The intermediate polyamides (II) are prepared by a number of methods. For example, the known polymethyl or ethyl ester of 1,2,3,4-cyclopentanetetracarboxylic acid is reacted with an excess of or a calculated amount of the amine reagent, $HNR_1R_2$, in a suitable solvent. The reaction can be in an autoclave, in a solvent such as methanol or water, in an excess of the amine or even in a high boiling solvent from which the low boiling alcohol formed by condensation can be distilled.

The triamides are produced by reacting a known triester or a diester anhydride of cyclopentanetetracarboxylic acid with an amine as suggested.

The diamides are produced by reacting a known diester, diester monoanhydride or dianhydride or cyclopentanetetracarboxylic acid with an amine as suggested.

The monoamides are prepared by reacting a known monoester or monoester anhydride of cyclopentanetetra-carboxylic acid with an amine as suggested.

The alkali metal and amine salts and the lower alkyl esters of these intermediates are prepared by methods well known to the art and apparent from the Examples. Sources of starting materials and preparative methods may be had in U. S. Pat. No. 3,346,598; U.S. Pat. No. 3,194,816; U.S. Pat. No. 3,388,187; U.S. Pat. No. 3,455,990; and U.S. Pat. No. 3,501,494.

The following Examples illustrate how the compounds of this invention may be prepared

EXAMPLE 1

Tetramethyl ester of cyclopentanetetracarboxylic acid (7.55 g.) is heated at reflux with cyclohexylamine (50 ml.) for 5 hours. The excess amine is taken off in vacuo to give the tetracyclohexylamide The amide (5.6 g.) in a Soxhlet extractor is reacted with lithium aluminum hydride (1.2 g.) in ether at reflux. After reaction for 24 hours, the mixture is quenched in dilute aqueous hydrochloric acid, neutralized and extracted by ether to give tetra(cyclohexylaminomethyl)cyclopentane. An ether solution of 200 mg. of the amine is saturated with dry hydrogen chloride gas to give the tetrahydrochloride salt.

Substituting dicyclohexylamine above gives tetra(dicyclohexylaminomethyl)pentane.

EXAMPLE 2

The tetramethylester (7.55 g.) is heated at reflux for 5 hours with cyclohexylamine (6.0 g.). The solid formed is boiled with methanol, filtered and the filtrate cooled to give tri(cyclohexylamido)monomethyl ester of cis-cyclopentanetetracarboxylic acid. This compound (4.0 g.) is reacted with 1.1 g. of lithium aluminum hydride in ether at reflux, then worked up by quenching and ether extraction to give tri(cyclohexylaminomethyl)mono(hydroxymethyl)cyclopentane as the sulfate salt.

EXAMPLE 3

Cyclopentanetetracarboxylic acid dianhydride (21 g.), cyclopentylamine (23.1 ml.) and toluene (100 ml.) are stirred then distilled over a Dean & Stark trap for 1 hour. The solid is removed and washed with hot acetone to give dicyclopentylamide of all cis-cyclopentanetetracarboxylic acid.

This material is heated with acidified methanol to give the diester which (2.1 g.) is heated in ether with lithium aluminum hydride (1 g.) to give di(cyclopentylaminomethyl)di(hydroxymethyl)cyclopentane. The sulfate is formed with a slight excess of sulfuric acid in ether.

EXAMPLE 4

Cyclopentanetetracarboxylic acid monoanhydride (0.57 g.) with cyclohexylamine (2 ml.) and toluene (5 ml.) is heated on the steam bath for 30 minutes. The cooled mixture is triturated with ether (10 ml.) and filtered to give the mono(cyclohexylamido)tricyclohexy lamine salt of the tetra acid. The salt is neutralized, esterified and reduced as described in Example 3 to give cyclohexylaminomethyltri(hydroxymethyl)-cyclopentane.

Using the methods described specifically above with variations in starting materials, other compounds of this invention can be readily prepared.

What is claimed is:

1. A compound of the formula:

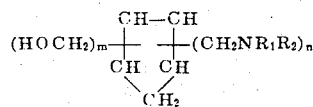

in which $R_1$ and $R_2$ are hydrogen or cycloalkyl of from 5–6 carbon atoms at least one of $R_1$ and $R_2$ being cycloalkyl; $n$ is an integer from 1–4; and $m$ is an integer from 0–3, the sum of $m$ and $n$ being 4.

2. The compound of claim 1 in which $R_1$ is hydrogen, $R_2$ is cyclohexyl, $m$ is 0 and $n$ is 4.

3. The compound of claim 1 in which $R_1$ is hydrogen, $R_2$ is cyclohexyl, $m$ is 3 and $n$ is 1.

* * * * *